US012597370B2

(12) United States Patent
Giaimo et al.

(10) Patent No.: US 12,597,370 B2
(45) Date of Patent: Apr. 7, 2026

(54) FLAG LABEL

(71) Applicant: Brady Worldwide, Inc., Milwaukee, WI (US)

(72) Inventors: Jon J. Giaimo, Grand Haven, MI (US); Christopher R. Gauthier, Wauwatosa, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 85 days.

(21) Appl. No.: 18/008,041

(22) PCT Filed: Jun. 3, 2021

(86) PCT No.: PCT/US2021/035703
§ 371 (c)(1),
(2) Date: Dec. 2, 2022

(87) PCT Pub. No.: WO2021/247864
PCT Pub. Date: Dec. 9, 2021

(65) Prior Publication Data

US 2023/0351924 A1 Nov. 2, 2023

Related U.S. Application Data

(60) Provisional application No. 63/035,348, filed on Jun. 5, 2020.

(51) Int. Cl.

| | |
|---|---|
| ***G09F 3/10*** | (2006.01) |
| ***G09F 3/00*** | (2006.01) |
| *G09F 3/02* | (2006.01) |

(52) U.S. Cl.
CPC .............. *G09F 3/0295* (2013.01); *G09F 3/10* (2013.01); *G09F 2003/0222* (2013.01);
(Continued)

(58) Field of Classification Search
CPC ................................ G09F 3/10; G09F 3/0295
See application file for complete search history.

(56) References Cited

U.S. PATENT DOCUMENTS

| | | | | |
|---|---|---|---|---|
| 1,337,722 A | 4/1920 | Porter | | |
| 3,228,129 A * | 1/1966 | Dover | ....................... | G09F 3/10 283/80 |

(Continued)

FOREIGN PATENT DOCUMENTS

| | | |
|---|---|---|
| DE | 202012005901 U1 | 7/2012 |
| GB | 2311273 A | 9/1997 |

(Continued)

OTHER PUBLICATIONS

European Patent Office, Extended Search Report, Application No. 21818560.1, May 22, 2024, 9 pages.

(Continued)

*Primary Examiner* — Shin H Kim
(74) *Attorney, Agent, or Firm* — Quarles & Brady LLP

(57) ABSTRACT

The flag label for attachment around an elongated object has a pair of faces oppositely facing from one another surrounded by a peripheral edge, One of the pair of faces is bifurcated into uneven portions at a line. Those uneven portions include an adhesive-bearing portion having adhesive received thereon and further include a non-adhesive bearing portion not having adhesive thereon. The non-adhesive bearing portion may be larger in surface area than the adhesive bearing portion such that, when folded onto one another, there is little to no possibility that adhesive remains exposed about the periphery of joining due to imperfect alignment of the edges of the two contacting portions.

17 Claims, 2 Drawing Sheets

(52) U.S. Cl.
CPC ................ *G09F 2003/0229* (2013.01); *G09F 2003/0251* (2013.01); *G09F 2003/0266* (2013.01)

(56) References Cited

U.S. PATENT DOCUMENTS

| | | | | | |
|---|---|---|---|---|---|
| 3,837,101 | A * | 9/1974 | Young | A45C 13/42 | 292/307 R |
| 4,656,767 | A * | 4/1987 | Tarrant | G09F 3/04 | 174/112 |
| 4,884,827 | A * | 12/1989 | Kelley | G09F 3/10 | 156/DIG. 5 |
| 5,378,515 | A | 1/1995 | Hatton | | |
| 5,707,082 | A * | 1/1998 | Murphy | B41J 3/4075 | 283/67 |
| 5,829,789 | A | 11/1998 | Treleaven et al. | | |
| 6,303,201 | B1 * | 10/2001 | Baierl | G09F 3/04 | 40/6 |
| 6,497,063 | B1 | 12/2002 | Stephens | | |
| 6,651,362 | B2 | 11/2003 | Caveney | | |
| 6,929,415 | B2 | 8/2005 | Wilken | | |
| 7,527,843 | B2 * | 5/2009 | Bethune | B32B 7/12 | 428/354 |
| 7,579,059 | B2 * | 8/2009 | Chamandy | G09F 3/0288 | 428/40.1 |
| 7,752,794 | B2 * | 7/2010 | Kerlin | G09F 3/005 | 428/41.9 |
| 8,167,336 | B2 * | 5/2012 | Minor | G09F 3/0288 | 40/6 |
| 8,567,674 | B2 * | 10/2013 | Conaghan | G09F 3/0288 | 235/384 |
| 8,595,963 | B2 * | 12/2013 | Olivarez | G09F 3/0295 | 40/316 |
| 8,881,438 | B2 * | 11/2014 | Shimizu | G09F 3/0297 | 40/6 |
| 9,842,517 | B1 * | 12/2017 | Amami | G09F 3/005 | |
| 10,407,200 | B2 * | 9/2019 | Banno | G09F 3/0295 | |
| 10,438,517 | B2 * | 10/2019 | Murayama | G09F 3/02 | |
| 11,557,228 | B1 * | 1/2023 | Kraft | G09F 3/005 | |
| 2007/0063506 | A1 | 3/2007 | Sellars | | |
| 2009/0038736 | A1 | 2/2009 | Lorence et al. | | |
| 2009/0277570 | A1 * | 11/2009 | Caveney | G09F 3/02 | 428/40.1 |
| 2010/0313454 | A1 * | 12/2010 | Smith, Jr. | G09F 3/10 | 427/256 |
| 2011/0179686 | A1 * | 7/2011 | Morehouse | G09F 3/005 | 40/633 |
| 2012/0198738 | A1 * | 8/2012 | Olivarez | G09F 3/0295 | 156/185 |
| 2013/0219759 | A1 * | 8/2013 | Kimes | B31D 1/027 | 40/6 |

FOREIGN PATENT DOCUMENTS

| | | | |
|---|---|---|---|
| JP | 2004004933 | A | 1/2004 |
| JP | 2007101894 | A | 4/2007 |
| JP | 2009022163 | A | 2/2009 |
| JP | 2015114654 | A | 6/2015 |
| JP | 2019179125 | A | 10/2019 |
| WO | 2010132567 | A1 | 11/2010 |

OTHER PUBLICATIONS

PCT International Search Report and Written Opinion, PCT/US2021/035703, Sep. 17, 2021, 9 pages.

Japanese Patent Office, Notice of Reasons for Refusal, Application No. 2022-574408, Mar. 5, 2025, 14 pages.

* cited by examiner

FLAG LABEL

CROSS-REFERENCE TO RELATED APPLICATION

This application represents the U.S. national stage entry of International Application No. PCT/US2021/035703 filed Jun. 3, 2021, which claims the benefit of U.S. Provisional Patent Application No. 63/035,348 entitled "Flag Label" filed on Jun. 5, 2020, which is incorporated by reference herein for all purposes.

STATEMENT OF FEDERALLY SPONSORED RESEARCH OR DEVELOPMENT

Not applicable.

BACKGROUND

This application relates to flag labels that may be wrapped around a slender object.

Labels are ubiquitous and frequently used to mark an object or provide indicia where it may be otherwise difficult to directly mark or print on the object. Because labels are typically designed for attachment to an object, it is well known in the state of the art to use adhesive to affix a label to an object. Typically, such adhesive labels come on a liner or sheet to cover the adhesive prior to attachment. Still attached to the liner or sheet, a user may print on the label using machine printing or by writing by hand on the label. After printing, the label can then be detached from the liner and adhesively affixed to the object.

Because there are many potential use cases for labels, there are multiple types of label designs and forms of attachment. In perhaps the simplest use case, many labels are fully adhered to the object along one adhesive bearing surface of the label so the printable area oppositely facing to the adhesive bearing surface remains visible. However, alternative designs exist. For example, for slender objects, such as wires, it is known to use a flag label type design in which the center of the label is generally aligned with the slender object and the two sides are closed together like a book or clamshell to adhere them together while the wire or slender object is captured between them near their original center. This has the advantage that the parts folded together form a "flag" that projects generally away from the object with the flag providing a greater surface area for receiving printing and that may be more readily visible to a viewer based on increase surface area and projection.

SUMMARY

However, such flag labels are not without problems. For example, it is rather tedious to fold a rectangular strip manually about a slender object and onto itself. Further, when the joined sections do not align with one another, this can cause frustration because, at that point, the halves are already adhesively joined and not readily separated without the possibility of damage to the adhesive quality or label. Indeed, in an attempt to more reliably and reproducibly affix such flag labels to slender objects, automated machines have been produced; however, those machines are complicated in nature and are designed for high volume applications.

An artifact of this difficulty in attaching flag labels is that, when imperfectly performed and the edges do not align, portions of the adhesive bearing surface of the label may peek out beyond the periphery of the joined section. Those exposed adhesive areas stand to collect dust and debris on them or worse shed that adhesive to surrounding nearby areas which then themselves can collect the dust and debris. Such exposed adhesive also creates the potential for sticking of the flag to nearby objects. Beyond all of these concerns relating to adhesive exposure, such misalignment of flag labels can also create a sloppy and unprofessional appearance when work involving flag labels is viewed by others.

Disclosed herein is an improved flag label design that avoids the possibility of exposed adhesive edges that are endemic to conventional flag labels. This improved flag label is elegant in design and involves the bifurcation of the surface of the flag label into two sections including a non-adhesive bearing section and an adhesive bearing section. The adhesive bearing section can be intentionally smaller in surface area than the non-adhesive bearing section so that, when folded together, there is no periphery to be matched and the entirety of the periphery of the adhesive bearing section falls within the periphery of the non-adhesive bearing section. With this design, there are no edges to be matched that can be misaligned with one another. Another way of putting this is that there is an engineered offset between the peripheries of the two sections such that a portion of the non-adhesive bearing portion remains exposed on the side contacting the adhesive bearing portion and there is no part of the adhesive bearing portion that is readily misalignable so as to extend beyond the periphery of the non-adhesive bearing portion.

According to one aspect, a flag label is provided for attachment around an elongated object. The flag label includes a pair of faces oppositely facing from one another that are surrounded by a peripheral edge. One of the pair of faces is bifurcated into uneven portions at a line including an adhesive bearing portion having adhesive received thereon and further including a non-adhesive bearing portion not having adhesive exposed thereon. In some forms, the non-adhesive bearing portion may be larger in surface area than the adhesive bearing portion.

In some forms, a width of the adhesive bearing portion of the flag label as measured in a direction parallel to the line of bifurcation may decrease as the width is measured at positions further from the line of bifurcation.

In some forms, when the flag label is folded at the line of bifurcation to contact the adhesive bearing portion with the non-adhesive bearing portion, at least a portion of a surface area of the face of the non-adhesive bearing portion contacted by the adhesive bearing portion may remain exposed and not covered by the adhesive bearing portion. In such form, the peripheral edge of the adhesive bearing portion may be offset inwardly with respect to the peripheral edge of the non-adhesive bearing portion, such that a portion of the non-adhesive bearing portion remains exposed.

In some forms, the adhesive bearing portion may have a surface area no more than 75% of the surface area of non-adhesive bearing portion.

In some forms, the flag label may include a substrate [such as, for example, polyethylene terephthalate (PET)] that supports adhesive thereon. The adhesive may cover the substrate over the entirety of one of the pair of faces and an ink coating may be applied to the adhesive in the non-adhesive bearing area to deaden the adhesive. A releasable liner may cover the adhesive. The substrate may include a clear varnish or a print-receptive primer on a face of the substrate opposite the face of the substrate supporting the adhesive.

In some forms, the non-adhesive bearing portion may be generally rectangular and the adhesive bearing portion may be tapered widthwise as the adhesive bearing portion extends away from the line of bifurcation.

According to another aspect, a media roll is provided including a liner having a plurality of the flag labels of any one of the types described herein with their respective adhesive-bearing portions received on the liner. In this configuration and form, the one of the pair of faces not supporting the adhesive may be provided for printing thereon, for example, using a printer.

According to still another aspect, a method is provided of attaching a flag label of any of the types described herein to a slender object. The one of the pair of faces that is bifurcated into uneven portions is placed such that it faces the slender object. The adhesive bearing portion is contacted with the non-adhesive bearing portion to affix the adhesive bearing portion with the non-adhesive bearing portion whilst capturing the slender object therebetween to create a flag projecting away from the slender object.

According to yet another aspect, an alternative method is provided of attaching the disclosed flag label to a slender object. The adhesive bearing portion having adhesive received thereon is wrapped about the slender object and back onto itself in a spiral fashion until only the non-adhesive bearing portion not having adhesive exposed thereon remains and projects away from slender object as a flag.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 2:
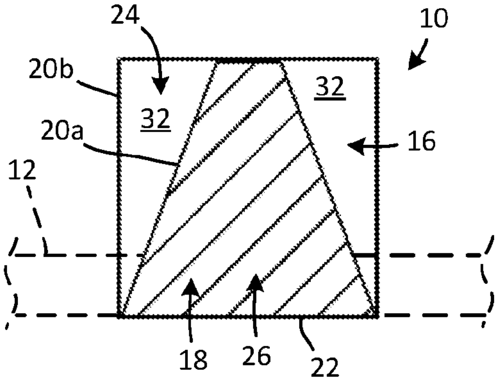
FIG. 2 is a front view of the flag label of FIG. 1, after the flag label has been wrapped around a wire or other elongated object.
Figure 3:
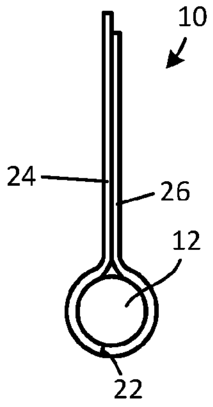
FIG. 3 is a side view of the flag label of FIGS. 1 and 2 wrapped along an elongated object attached slightly differently than in FIG. 2, which the adhesive bearing portion slightly offset from the top edge of the non-adhesive bearing portion.
Figure 4:
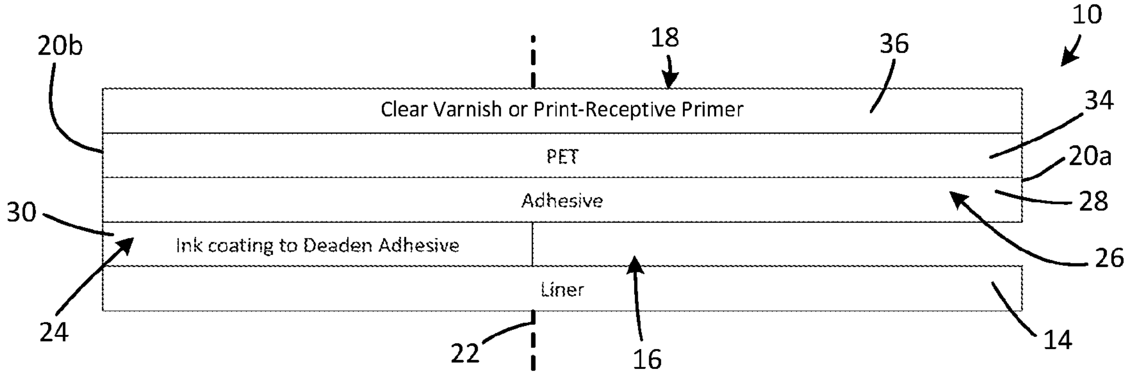
FIG. 4 is a schematic illustrating a layer structure of the label of FIGS. 1 through 3.

Referring to FIGS. 1 through 4, a flag label 10 is illustrated both in an initially unfolded non-attached state (as in the front view of FIG. 1 and the schematic layer view of FIG. 4) and in a folded attached state (as in FIGS. 2 and 3) in which the flag label 10 has been attached around a slender or elongated object 12, such as a wire or rod. For the sake of improving understanding, it should be appreciated that the side view of FIG. 3 does not illustrate all of the stacked layers and that the layer view of FIG. 4 has layer thickness exaggerated for clarity. FIG. 4 also further includes a liner 14, which is not illustrated in FIGS. 1 through 3 and from which the flag label 10 is removed prior to application to the elongated object 12.

Figure 1:
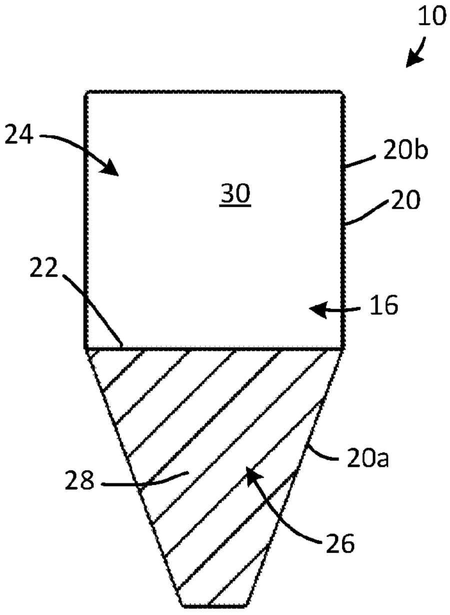
FIG. 1 is a front view of a flag label separate from any liner and in a flat, unattached state.

The flag label 10 is a generally thin, planar object that can be formed from multiple layers as will be discussed in greater detail below with respect to FIG. 4. Being sheet-like in form, the flag label 10 includes a pair of faces 16 and 18 oppositely facing from one another that are surrounded by a periphery 20. Because FIG. 1 is a front view, it only depicts face 16 with the other face 18 facing opposite to the plane being viewed. These faces 16 and 18 are better seen in the layer view of FIG. 4 (although it will again be appreciated that a liner 14 initially covers the face 16 as depicted in FIG. 4) or the folded view of FIG. 2 showing sections of both faces 14 and 16.

Returning now to FIG. 1, the face 16 is bifurcated into uneven portions at a line 22 extending between two sides of the periphery 20. These uneven portions include a non-adhesive bearing portion 24 without adhesive 28 exposed thereon and an adhesive bearing portion 26 having adhesive 28 received thereon. It will be appreciated that the non-adhesive bearing portion 24 need not be completely absent of adhesive 28, but rather may have any adhesive 28 in this region not exposed for adhesion. For example and as best illustrated in FIG. 4, the adhesive 28 on the non-adhesive portion 24 may be deadened adhesive, for example, by the application of an ink coating 30 to a portion of an underlying adhesive 28. This ink coating 30 may be white (or possibly other colors) to create contrast with any printing ink that is ultimately used to print on the flag label 10.

Notably, the non-adhesive portion 24 has a larger surface area than does the adhesive bearing portion 26. In this way, when the two portions 24 and 26 of face 16 are folded into contact with one another in a book-like or clamshell fashion (as is generally depicted in FIGS. 2 and 3), there remains exposed areas 32 (best seen in FIG. 2) of the non-adhesive bearing portion 24 which are not contacted by or covered by the adhesive bearing portion 26 on the face 16.

With a general understanding that the principle of operation of this design is that the adhesive bearing portion 26 is undersized relative to the non-adhesive bearing portion 24 to prevent the possibility of misalignment of evenly-sized portions or matching peripheries creating the potential for exposed adhesive at the edges, various geometric conditions can be stated that may result in acceptable forms or shapes for the flag label 10.

As a first example, the adhesive bearing portion 26 may have a surface area no more than 75% of the surface area of non-adhesive bearing portion 24. This may provide a sufficient amount of surface area difference to create an edge buffer, while also providing a sufficient amount of adhesive contact for maintaining a strong attachment of the flag label 10 after application. Still further, it is contemplated that in various forms the adhesive bearing portion 26 may have a surface area no more than 80%, 66%, 60%, 50%, or 25% of the surface area of non-adhesive bearing portion 24, as this may be sufficient in the case the adhesive connection is sufficiently strong and the substrate is not prone to tearing based on its shape and thickness.

As another example of acceptable geometric conditions, at least some and more preferably all of the periphery **20*a* of the adhesive bearing portion 26 is inwardly offset from the periphery 20*b* of the adhesive bearing portion 24 such that there is no possibility of there being exposed adhesive 28** after portions 24 and 26 are joined. In this case, "inwardly" may refer to a direction taken from the periphery towards a center point of line 22.

A related consideration that flows from such offset is also that, at any particular position along the line 22, the distance measured perpendicularly from the line 22 to the periphery 20*a* of the adhesive bearing portion 26 will be less than or equal to the distance measured perpendicularly from the line 22 to the periphery 20*b* of the non-adhesive bearing portion 24. In the case where there is a complete offset, this amount will always be less. However, even if there is a small portion (for example, less than 20% of the overall periphery 20) at which the peripheries 20*a* and 20*b* might align, it would still be the case that some of these measured distances will be smaller than the others.

As previously stated, if the periphery 20*a* of all or at least the majority of the adhesive bearing portion 26 is inwardly offset from the periphery 20*b* of the adhesive bearing portion 24 when the halves are folded at the line 22, then there is a gap engineered in that prevents the possibility of edge misalignment. That said, it is contemplated that there could be very minimal edge alignment such as depicted in FIG. 2. However, as depicted in FIG. 3, there is ideally a gap created around the entire periphery 20.

Still further, another geometric condition to result in the desired condition may be that the non-adhesive bearing portion 24 is rectangular or square, while the adhesive bearing portion 26 is tapered towards its end, which as depicted results in an isosceles trapezoidal shape. In such case the adhesive bearing portion 26 need not specifically be an isosceles trapezoidal shape, but could take other forms, such as, for example shapes in which a width of the adhesive bearing portion 26 of the flag label 10 as measured in a direction parallel to the line 22 of bifurcation decreases as the width is measured at positions further from the line 22 of bifurcation.

It will be appreciated that these are but some example conditions (and, in many instances, various ways of stating roughly the same thing). Accordingly, these conditions, combinations thereof, as well as other possible conditions to prevent the possible misalignment of edges exposing adhesive may be readily adopted in the design of the flag label 10.

Looking at FIGS. 2 and 3, a typical mode of attachment is illustrated for the flag label 10 in which the face 16 has been folded onto itself. However, it will be appreciated that the flag label 10 could be attached differently while providing a similar result of non-exposed adhesive. For example, the tip of the adhesive bearing portion 26 of the flag label 10 furthest from the line 22 may be first attached to the elongated object 22. With the tip attached, the adhesive bearing portion 26 can then be wrapped around the elongated object 22 and back onto itself such that the adhesive 28 eventually contacts the other face 18 of the adhesive bearing portion 26 to form a spiraled wrap around the elongated object 22. After enough wrapping, the line 22 will be reached and the remaining portion of the flag label 10 (i.e., the non-adhesive bearing portion 24) will project as a flag and cannot adhere to face 18. Again, this is not the primarily conceived use case for attachment, but the flag label 10 may also be attachable and useable in this manner. It is also noted that while, for the clamshell arrangement, the difference in areas between the adhesive and non-adhesive bearing portions is meaningful to ensure there is no exposed adhesive after folding, in the spiral arrangement, it is possible that the attached tail or adhesive bearing portion could be larger than the non-adhesive bearing flag portion.

Looking specifically now at FIG. 4, a layer structure for the flag label 10 is more explicitly described. Here, it is more clearly shown that there is an underlying substrate 34 upon which the adhesive 28 is supported. This substrate 34 can be, for example, a polymer, such as polyethylene terephthalate (PET) as illustrated, or potentially made from a fibrous or paper-based layer, and those having skill in the art will appreciate that the substrate 34 could be made from any one of a number of different materials. As illustrated, one side of the substrate 34 supports the adhesive 28 while the other side supports a clear varnish or a print-receptive primer 36 (e.g., the primer could be a polyester-based primer).

With respect to the adhesive 28, as illustrated the entirety of the face 16 supports the adhesive 28 and the aforementioned ink coating 30 is applied to portions of the adhesive 28 which are intended to be deadened to provide the non-adhesive bearing portion 24. The adhesive bearing portion 26 may be attached to a liner 14, from which the adhesive bearing portion 26 may be separated to remove the flag label 10 from the liner 14 to expose the adhesive 28 prior to use. It is noted that ink coating 30 will not actually adhere to the liner 14 and may flap up therefrom. Thus, the layer structure of FIG. 4 is actually somewhat imprecisely depicted in that it does not illustrate that adhesive 28 is actually in releasable contact with the liner 14.

On the face 18 of the flag label 10 and opposite the side of the substrate supporting the adhesive 28, the clear varnish or the print-receptive primer 36 can be received on the substrate 34. This clear varnish or the print-receptive primer 36 can change the surface properties of the substrate 34 so as to make it more receptive to printing, such as thermal heat transfer printing or ink jet printing, for example (although any one of a number of types of machine printing using printers could be used as well as hand writing on such a surface and the substrate, if not already suited to receive such printing, may have its surface modified accordingly by the use of a varnish, primer, or other layer). It will be appreciated that, even if the clear varnish or the print-receptive primer 36, substrate 34, and adhesive 28 are substantially clear, that the ink coating 30—which may be white in color—used to deaden the adhesive 28 may be used to provide contrast to the printed layer on the clear varnish or the print-receptive primer 36.

Figure 5:
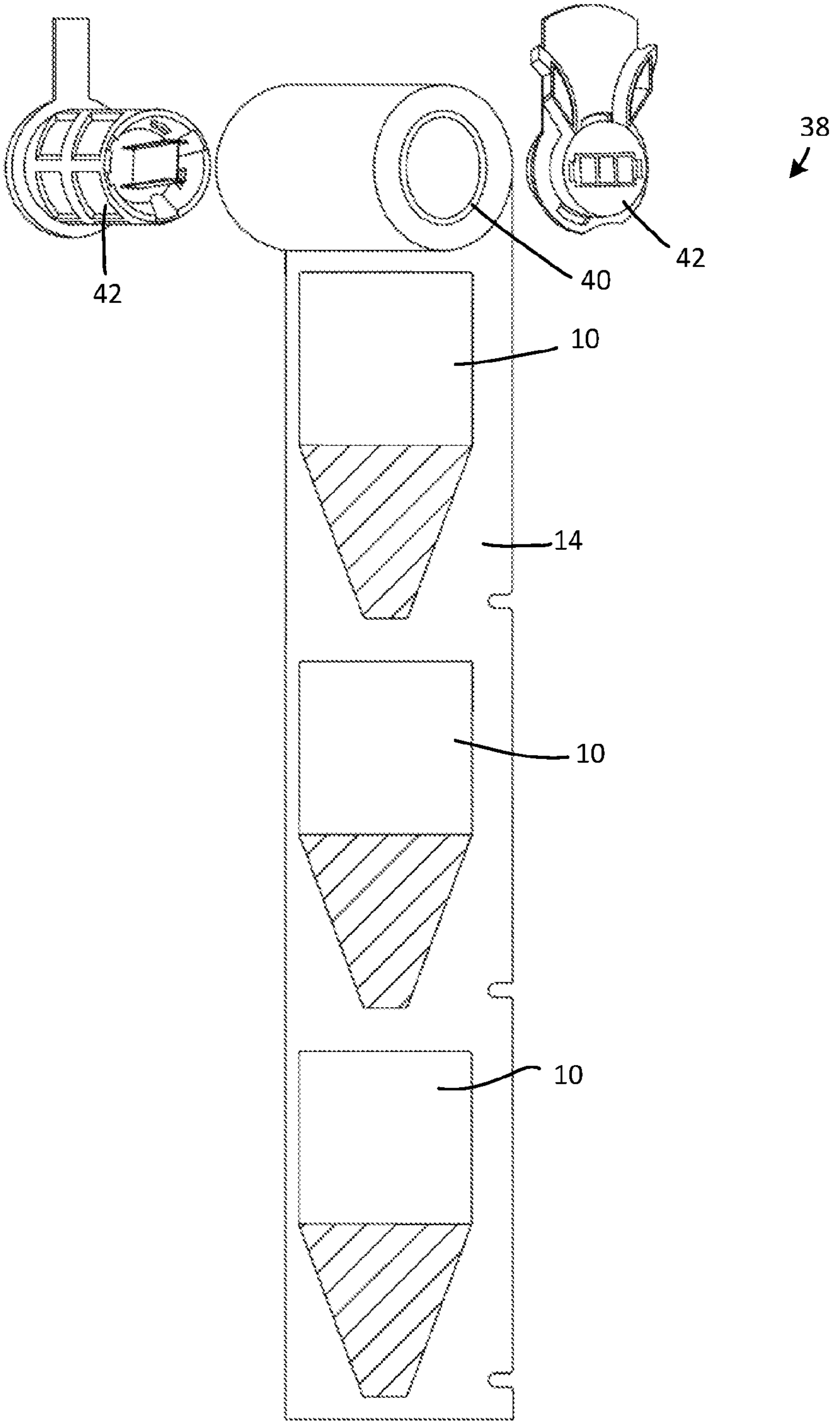
FIG. 5 is an exploded view of a media roll in which a spool is exploded from a core upon which a liner is rolled and in which the liner supports a number of the flag labels of FIG. 1. The use of the liner permits printing on the flag labels while the flag labels are still on the liner while still permitting the flag labels from being detached therefrom after printing.

Turning now to FIG. 5, a media roll 38 is illustrated in which a liner 14 in continuous strip form supports a plurality of the previously described flag labels 10 along its length. For the sake of clarity, it should be appreciated that the flag labels in FIG. 5 are actually shown with the face 18 viewable, and is the reverse of the orientation of the flag label 10 of FIG. 1 even though they appear similar. Here, one end of the liner 14 may be attached to a core 40 (which may be, for example, a fibrous paper or cardboard core) about which the liner 14 and flag labels 10 are coiled. While not depicted, a short length of tape may be used to attach the liner 14 at one end to the core 40. This core 40 can be received on a spindle 42, which as illustrated is exploded into two portions and which can be adapted for mounting in a printer or machine, and the core 40 may be rotatable about the spindle 42 as the liner 14 and flag labels 10 are fed from the media roll 38.

Notably, with the adhesive 28 being attached to the liner 14, this leaves the clear varnish or the print-receptive primer 36 (or more generally the face 18 of the flag label 10 not bearing the adhesive 28) available for printing while the flag label 10 is on the liner 14. Because it is on a continuous liner 14, the liner 14 can be fed through a printer with the flag labels 10 thereon and the clear varnish or the print-receptive primer 36 (or more generally the face 18) can be printed upon. After printing, the flag label 10 can be separated from the liner 14 to expose the adhesive 28. Again, recall that the presence of the ink coating 30 means that non-adhesive bearing portion 24 can be lifted as a flap from the liner 14 to provide a pull tab and facilitate easy separation of the flag label 10 from the liner 14. After this removal, the separated flag label 10 can then be attached around an elongated object in the aforementioned ways.

While a single line of flag labels is illustrated in FIG. 5, one having skill in the art will readily appreciate that there could be multiple flag labels in multiple rows (for example, two, three or more labels at a particular point or row along the length of the liner).

Still further, it is noted that, because the non-adhesive portion can flap up, it may make the most sense to lead with the adhered end of the flag labels going into the printer to minimize the possibility of jamming.

It will again be appreciated that this improved flag label design offers an improvement over the current state of the art flag labels in that it allows clamshell type affixation without having to closely align or match edges that can create the possibility of exposed adhesive. While one specific embodiment has been illustrated, those having ordinary skill in the art will appreciate modifications can be made to the layer structure and/or shape of the flag label without departing from the basic concept disclosed herein. For example, extra layers may be added or layers removed or modified to achieve a similar effect (as one example, adhesive might be applied to only a portion of the face that is folded together, rather than the entirely of the face as illustrated).

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A flag label for attachment around an elongated object, the flag label comprising a pair of faces oppositely facing from one another surrounded by a peripheral edge in which one of the pair of faces is bifurcated into uneven portions at a line including an adhesive bearing portion having adhesive received thereon which is exposed up to the line of bifurcation and further including a non-adhesive bearing portion not having adhesive exposed thereon up to the line of bifurcation, wherein the non-adhesive bearing portion not having adhesive exposed comprises a deadened adhesive in which the deadened adhesive is an adhesive upon which an ink coating is applied to deaden the adhesive, and further wherein a width of the adhesive bearing portion of the flag label as measured in a direction parallel to the line of bifurcation decreases as the width is measured at positions further from the line of bifurcation.

2. The flag label of claim 1, wherein the non-adhesive bearing portion is larger in surface area than the adhesive bearing portion.

3. The flag label of claim 2, wherein, when the flag label is folded at the line of bifurcation to contact the adhesive bearing portion with the non-adhesive bearing portion, at least a portion of a surface area of the face of the non-adhesive bearing portion contacted by the adhesive bearing portion remains exposed and not covered by the adhesive bearing portion.

4. The flag label of claim 3, wherein, when the flag label is folded at the line of bifurcation to contact the adhesive bearing portion with the non-adhesive bearing portion, the peripheral edge of the adhesive bearing portion is offset inwardly with respect to peripheral edge of the non-adhesive bearing portion, such that a portion of the non-adhesive bearing portion remains exposed.

5. The flag label of claim 2, wherein the adhesive bearing portion has a surface area no more than 75% of the surface area of non-adhesive bearing portion.

6. The flag label of claim 1, wherein the flag label includes a substrate that supports adhesive thereon.

7. The flag label of claim 6, wherein the adhesive covers the substrate over the entirety of one of the pair of faces and an ink coating is applied to the adhesive in the non-adhesive bearing portion to deaden the adhesive.

8. The flag label of claim 6, further comprising a releasable liner that covers the adhesive.

9. The flag label of claim 6, wherein the substrate is polyethylene terephthalate (PET).

10. The flag label of claim 6, wherein the substrate includes a clear varnish or a print-receptive primer on a face of the substrate opposite the face of the substrate supporting the adhesive.

11. The flag label of claim 1, wherein the non-adhesive bearing portion is generally rectangular and the adhesive bearing portion is tapered widthwise as the adhesive bearing portion extends way from the line of bifurcation.

12. A media roll comprising a liner having a plurality of the flag labels according to claim 1 received thereon at their respective adhesive-bearing portions and wherein the one of the pair of faces not supporting the adhesive is provided for printing thereon.

13. A method of attaching a flag label according to claim 1 to a slender object, the method comprising:

placing the one of the pair of faces that is bifurcated into uneven portions such that it faces the slender object;

contacting the adhesive bearing portion with the non-adhesive bearing portion to affix the adhesive bearing portion with the non-adhesive bearing portion whilst capturing the slender object therebetween so as to create a flag projecting away from the slender object.

14. A method of attaching a flag label according to claim 1 to a slender object, the method comprising:

wrapping the adhesive bearing portion having adhesive received thereon about the slender object and back onto itself in a spiral fashion until only the non-adhesive bearing portion not having adhesive exposed thereon remains and projects away from the slender object as a flag.

15. The flag label of claim 1, wherein the ink coating provides contrast for the reception of a printed layer thereon.

16. The flag label of claim 15, wherein the ink coating is white.

17. The flag label of claim 1, wherein the adhesive of the adhesive bearing portion extends into the non-adhesive bearing portion not having adhesive exposed thereon, with the adhesive being deadened in the non-adhesive bearing portion.

* * * * *